United States Patent [19]

Baker

[11] Patent Number: 5,311,556
[45] Date of Patent: May 10, 1994

[54] DIGITAL FSK TRANSMITTER RECEIVER AND METHOD OF OPERATING SAME

[75] Inventor: William E. Baker, Mentor, Ohio

[73] Assignee: Elsag International B.V., Amsterdam, Netherlands

[21] Appl. No.: 752,758

[22] Filed: Aug. 30, 1991

[51] Int. Cl.[5] .............................................. H04L 27/14
[52] U.S. Cl. ........................................ 375/88; 375/82; 329/303
[58] Field of Search ................... 375/3, 9, 45, 48, 88, 375/89, 82; 329/300, 303; 331/179

[56] References Cited

U.S. PATENT DOCUMENTS

| | | | |
|---|---|---|---|
| 4,115,738 | 9/1978 | Mitarai et al. | 329/303 |
| 4,485,347 | 11/1984 | Hirasawa et al. | 375/88 |
| 4,551,846 | 11/1985 | Takeda et al. | 329/303 |
| 4,627,078 | 12/1986 | Stoner | 375/88 |
| 4,785,255 | 11/1988 | Lucak et al. | 375/88 |
| 5,105,444 | 4/1992 | Gard | 375/88 |

Primary Examiner—Stephen Chin
Assistant Examiner—Young Tse
Attorney, Agent, or Firm—Vytas R. Matas

[57] ABSTRACT

A digital FSK receiver includes a zero-crossing detector which detects the zero crossings in an FSK signal having at least two signal frequencies. The time interval between zero crossings is then measured with a first interval value corresponding to one of the signal frequencies and a second interval value corresponding to the other signal frequency. An accumulator outputs a digital signal which depends on whether the interval is at the first value or the second value, the digital signal including logical zeros and ones.

5 Claims, 7 Drawing Sheets

FIG.5
RESPONSE FOR 9600 BAUD

FIG.5A

FIG.6 RESPONSE FOR 9.6 KILOBAUD

DIGITAL FSK TRANSMITTER RECEIVER AND METHOD OF OPERATING SAME

FIELD AND BACKGROUND OF THE INVENTION

The present invention relates in general to frequency-shift keying (FSK) transmitters and receivers, and in particular to a new and useful digital FSK transmitter and receiver and method of operating same.

Frequency-shift keying is a form of frequency modulation used especially in telegraph and facsimile transmission. The modulating wave in frequency-shift keying shifts the output frequency between predetermined values corresponding to the frequencies of correlated sources.

Digital FSK transmitters are known. A digital phase locked loop which can be used as a component of an FSK receiver is also known, but this circuit requires the use of an analog filter to operate as an FSK receiver.

The inventor is not aware of any known instance of a digital FSK transmitter receiver. A digital FSK transmitter receiver would have several advantages over known analog FSK receivers. A digital FSK receiver would allow the use of a gate array rather than a mixed-mode ASIC (Application Specific Integrated Circuit). A gate array implementation is cheaper to develop, requires less turn-around time, and reduces the per part price to less than half that of a mixed-mode ASIC. A digital FSK receiver would also not require a filter which is necessary in analog FSK receivers. This would reduce board area required for the equipment by a factor of two.

SUMMARY OF THE INVENTION

The digital FSK transmitter receiver of the present invention utilizes information contained in the zero crossings of the received FSK digital signal. The digital FSK signal is transmitted by a dual register preprogrammed to add a predetermined count to an accumulator through an adder to generate the exact dual FSK frequencies required. The same clock signal used for the accumulator is also used as a signal for the dual registers by way of the signal going to the single stage shift register.

The zero crossings of the transmitted FSK signals are converted to a digital format by counting the number of clock pulses between successive zero crossings. A second clock is used to insert the last zero crossing count into a multistage FIFO (first in-first out buffer). An accumulator stores the sum of the values in the FIFO. A threshold is established whereby any value in the accumulator below the threshold is considered a zero and any value above is considered a one.

The accumulator and the FIFO serve as a "digital" filter. If a zero crossing is received early (or late) as a result of noise, the value in the accumulator will decrease (or increase). However, if the next zero crossing is not displaced, it will bring the accumulator back to its expected value.

Extensive computer simulations have demonstrated the utility of the present invention.

Thus an object of the present invention is to provide an FSK transmitter utilizing a clock feedback signal to generate the FSK frequencies from the accumulator.

Another object of the present invention is to provide a digital FSK receiver for receiving an FSK signal containing at least two different signal frequencies, comprising: a zero crossing detector for detecting zero crossings of the FSK signal; interval measuring means connected to the zero crossing detector for measuring the intervals between the zero crossings; a buffer for storing a number of previous zero crossing values; an accumulator for maintaining the sum of the stored zero crossing values (with a possible fixed offset); and a binary output means for outputting a one or a zero depending on whether the value in the accumulator is above or below a selected threshold.

A further object of the present invention is to provide a method of digitally receiving an FSK signal by detecting the intervals between zero crossings in the signal to generate either a zero or a one in a binary output.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
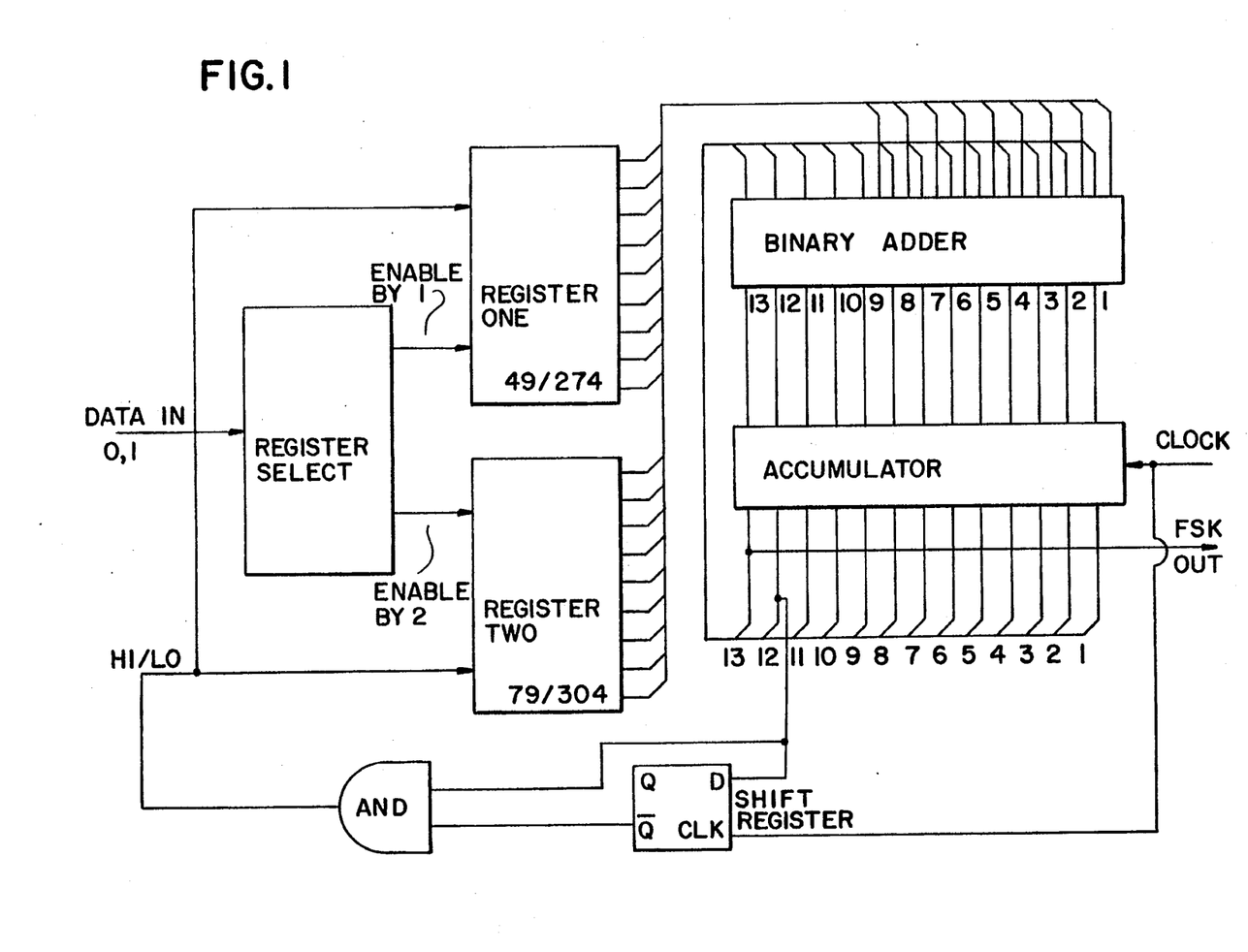
FIG. 1 is a block diagram showing a digital FSK transmitter which can be used to generate a binary FSK signal.

A digital FSK transmitter is illustrated in FIG. 1. The transmitter consists of a thirteen stage accumulator, a thirteen stage adder and means for adding a number to the accumulator at a 3 MHz rate as determined by the CLOCK used for the accumulator. With a fixed number, N, the thirteenth stage would alternate between a one and a zero with an average frequency being outputted at the FSK OUT determined by the formula:

$$freq(N)ave = (3,000,000*N)/8192$$

where:

freq(N) ave = average FSK frequency
3,000,000 = CLOCK frequency 3 MHz
N = number added to the accumulator $8192 = 2^{13}$ as determined by the 13 stages of the accumulator, each stage having 2 values This is specified as an average frequency because, if N is not a factor of 8192 (2**13th=8192), the frequency generated will shift between two frequencies such that the average is that defined above. In FSK transmission the actual frequency is important rather than the average.

In out embodiment we want to generate FSK frequencies of 19 KHz and 30.5 KHz. With a 3 MHz clock, the half period of the frequency generated must be a multiple of 333+n seconds (the period is the reciprocal of the frequency). The best we can do in generating these desired frequencies is to divide the 3 MHz generated by the clock by the divisors 158 and 98, giving us 18.987 KHz and 30.612 KHz respectively. To eliminate the averaging problem stated above we want the accumulator maximum value divisible by both 158 and 98. The largest number, less than 8192, which is divisible by both 158 and 98 is 7742. This number is 450 short of the full accumulator of 8192. It is essential that the output maintain a 50% duty cycle and so a convenient way of obtaining the desired count is to add 225 of 50% of 450 to the accumulator each half cycle. In the block diagram shown in FIG. 1, this is accomplished by having registers one and two normally add 79 or 49 to the accumulator (50% of 158 and 98 respectively) and once each half cycle the next 49 or 79 number is changed to 304 or 274 respectively to provide the 225 addition every half cycle. Note that 225 added to 79 and 49 respectively yields 304 and 274.

In operation the DATA IN signal to the register select is binary in nature (0, 1) and corresponds to the frequency output desired from the FSK OUT of the accumulator. The register select thus enables only register one for an input signal of 1 and enables only register two for an input signal of 0. The enabled register is thus activated to pass either of the two numbers stored therein to the binary adder. Register one has the numbers 49 and 274 stored therein while register two has the numbers 79 and 304 stored therein. The enabled register will transmit either the higher or lower of the two numbers depending on whether it receives a HI or LO signal on the HI/LO input line.

The HI/LO signal is derived from the output of an AND gate having inputs derived from the output of the 12th stage of the accumulator and the output, $\overline{Q}$, of a shift register which has input D from the 12th stage of the accumulator and is clocked by the 3 MHz CLOCK. Thus the output of the shift register Q is the accumulator 12th stage delayed by one clock cycle of the 3 MHz clock input CLK.

Thus the AND gate will generate a LO signal for all but one clock cycle of each half cycle of FSK OUT. Recall that we want to divide the 3 MHz clock by 158 or 98, depending on the data input. If we have an input of one, we are adding 49 156 times and 274 twice for each cycle of FSK OUT and 49*156+2*274=8192. If we have an input of zero, we are adding 79 96 times and 304 2 times and 79*96+2*304=8192.

The LO numbers transmitted from the registers are due to the inputs to the AND gate being opposite in sign except when the 12th stage of the accumulator changes from a 0 to a 1 indicating the need for adding the previously mentioned number 225 which is added to the next normally transmitted number, either 49 or 79, to make for a single transmission of either 274 or 304 from the 13th stage of the accumulator depending on whether register one or register two of the accumulator is enabled.

Figure 2:
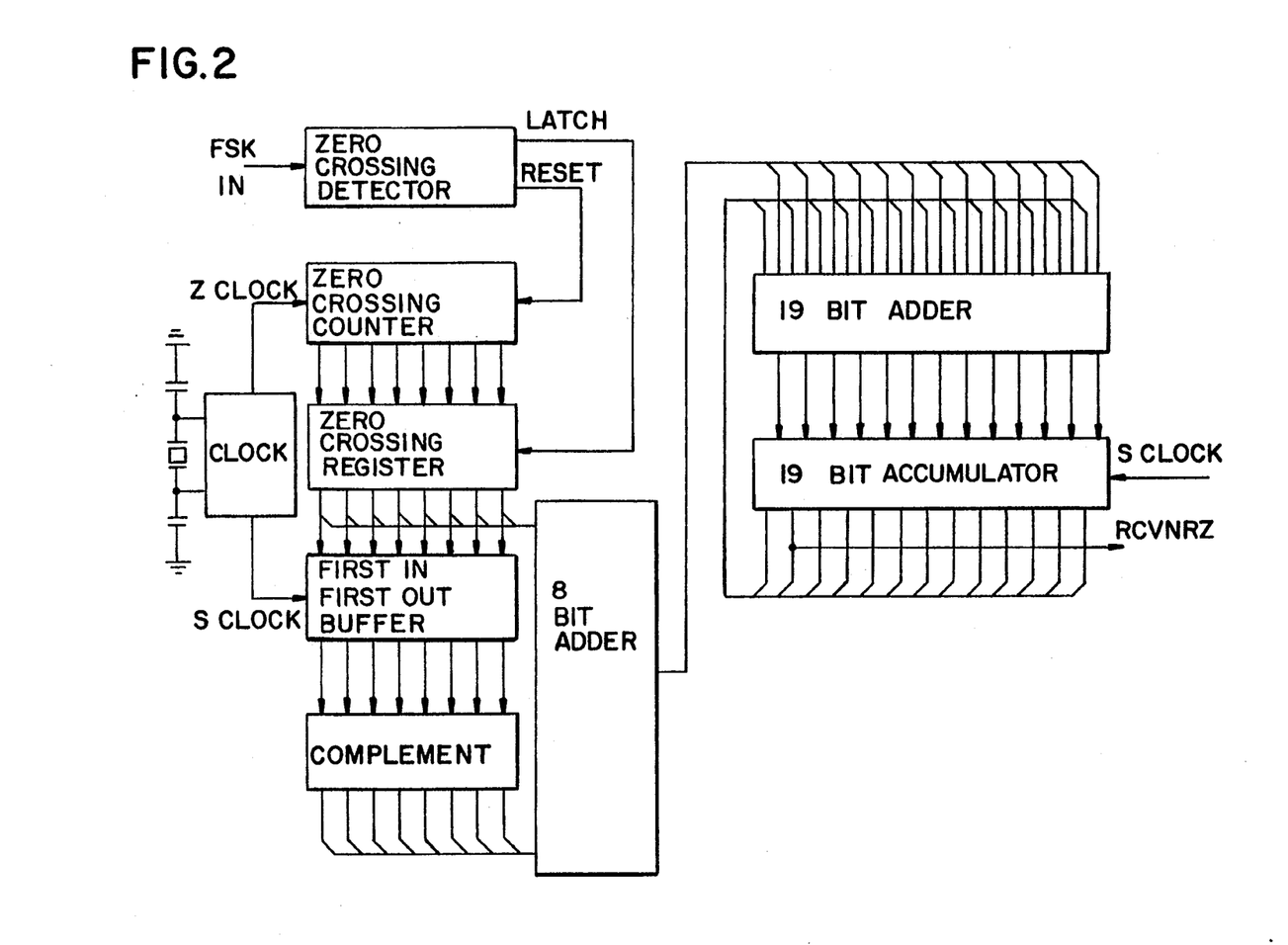
FIG. 2 is a block diagram of the digital FSK receiver of the present invention.

FIG. 2 illustrates the digital FSK receiver of the present invention. It has been designed so as to use most of the circuitry in the FSK transmitter shown in FIG. 1. In FIG. 2, intervals between zero crossings are converted to numbers by counting the pulses of a clock, labelled ZCLOCK, in a counter. At each zero crossing the count resulting from the previous interval is stored in a register. On each pulse of clock SCLOCK the value of the register is inserted in a 16 deep, 8 bit wide FIFO (first in first out) buffer. An accumulator stores the sum of the values in the FIFO (plus a fixed offset). Rather than sum the 16 values each time, the accumulator is kept current by subtracting the oldest value in the FIFO from the new value being inserted and adding the resultant to the accumulator.

If the received signal were a continuous zero (30.5 KHz), it would have zero crossing intervals of 16.393 microseconds. A continuous one (19 KHz) would have zero crossing intervals of 26.316 microseconds. With a ZCLOCK of 6 MHz these intervals would yield counts of 98 and 158 respectively. Thus a continuous 0 input would give a value for the sum of the FIFO of 1568 and a continuous 1 input would give a value of 2528. The mid-point is 2048, or 211th. As seen in FIG. 2, the baseband output is the 12th stage of the accumulator (a one in the 12th stage has a value of 211th).

When the transmitted data changes from 1 to 0 (or 0 to 1) there will be one zero crossing interval which will be between the two extremes. This intermediate count contains information which allows the receiver to determine where within the interval the change occurred. It is imperative for minimum jitter reception that this intermediate value be retained.

In the present embodiment, the SCLOCK is 250 KHz and, because the 13 stage adder is relatively slow, it is not practical to subtract the old value of the buffer between successive SCLOCKs. Instead, an 8 bit adder calculates the difference between the new and the old values of the FIFO and this result is added to the accumulator at the SCLOCK rate. It is important to note that the result to be added to the accumulator may be positive or negative. A negative number from the 8 bit adder is automatically expressed in two's complement form and so adding it to the accumulator will give the correct result.

The receiver of the present invention has been simulated using several BASIC programs. Calculations were performed to determine the spacings of zero crossings which would result from a perfect FSK transmitter being modulated by an input data stream. Delays were investigated for one to zero transitions and for zero to one transitions and the phase of the input data stream to the FSK signal was varied over all the possible values in increments of 1 microsecond.

Figure 3:
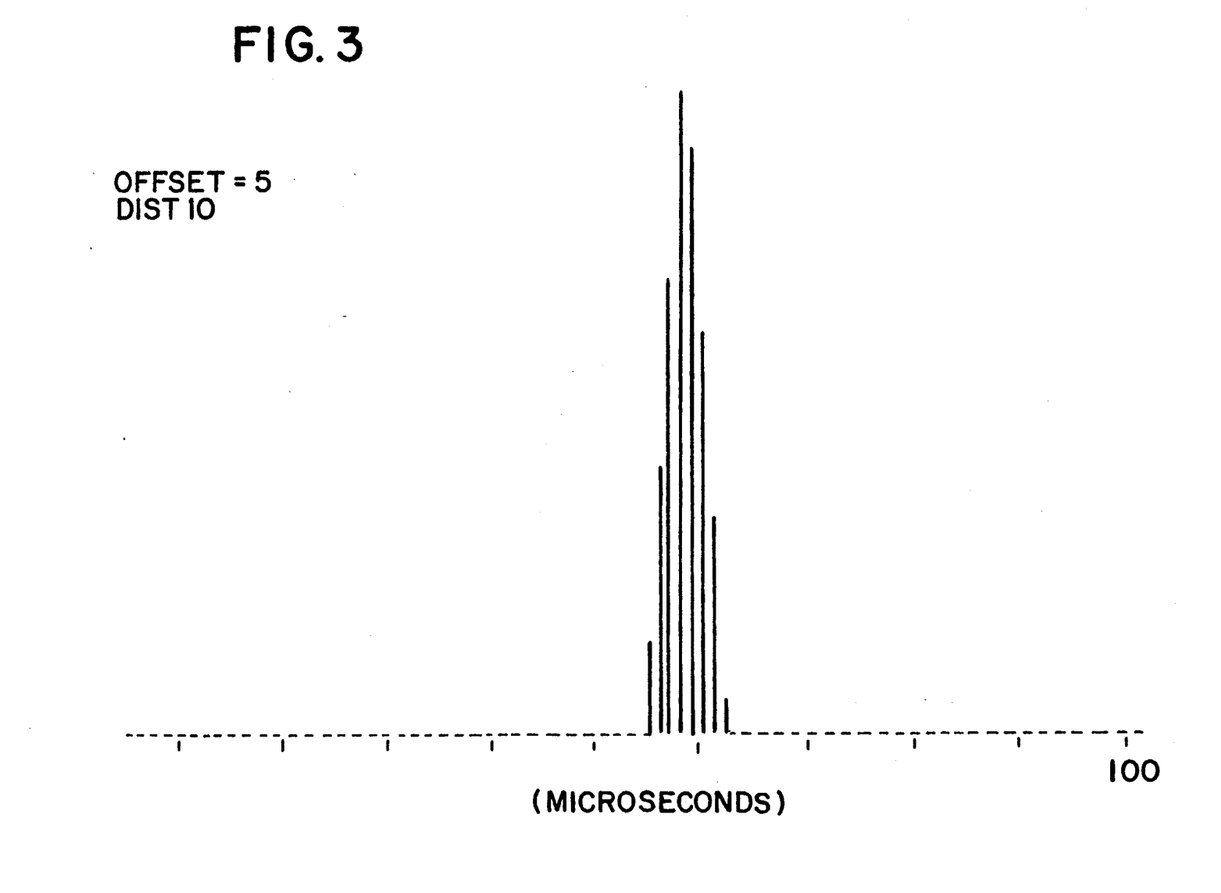
FIG. 3 is a graph plotting a signal against time and illustrating a delay distribution resulting from one simulation of the present invention.

In the first program, the delay in the change of the output relative to a change in the input data stream from a one to a zero, was investigated. The time t=0, was arbitrarily set to the last zero crossing before the input data changed. The program was run a number of times for the input changing at t=1 microseconds, 2 microseconds, up to 26 microseconds. The limit is 26 microseconds because, if it were any later than that, another zero crossing would occur before the input change. FIG. 3 shows the distribution of the delays (time of output change minus time of input change). The actual values are given in Table 1, and the program is listed in Table 2.

Figure 4:
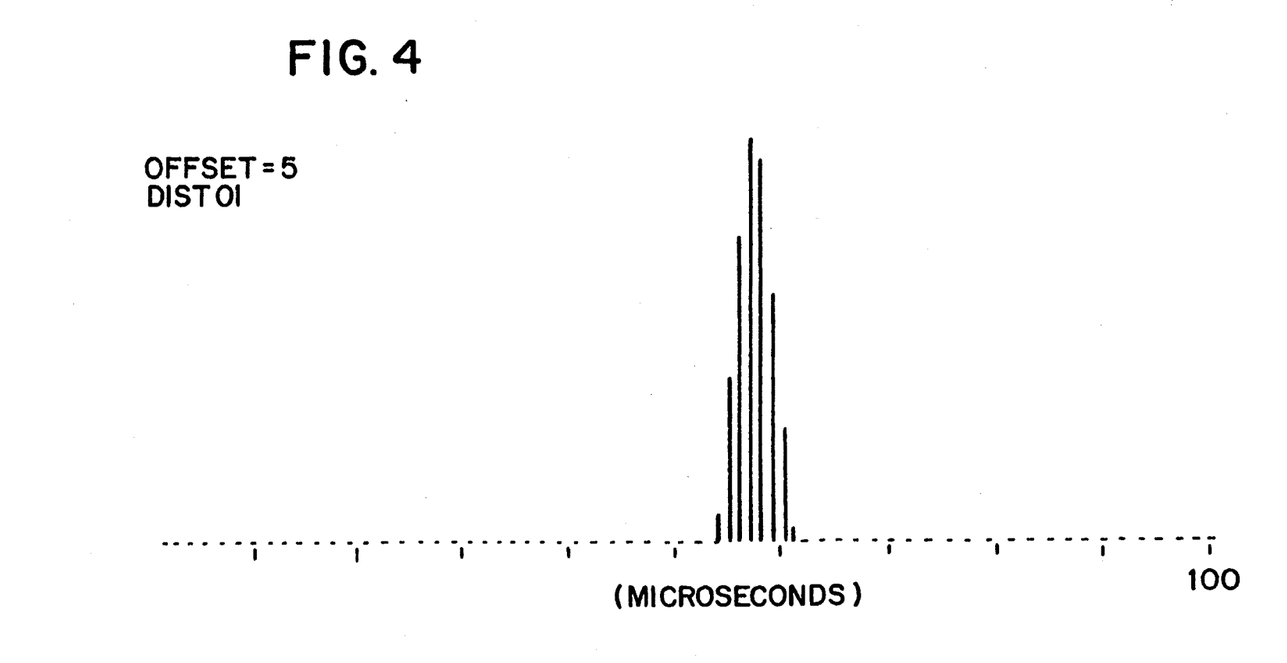
FIG. 4 is a view similar to FIG. 3 illustrating a delay distribution of a different simulation of the invention.

Similarly, the delay due to a change from a zero to a one was investigated. The distribution is shown in FIG. 4, the values are listed in Table 3, and the program is given in Table 4.

When the programs were originally run, the distribution for both cases was about +/−3.5%, but the average delays were different. This would result in a bias, causing ones and zeros not to have the same duration. The simplest way to counteract this bias is to offset the value stored in the accumulator, i.e., Accumulator Value=Sum of FIFO+$N_{COR}$ where $N_{COR}$ is a positive or negative integer.

A third program was run to demonstrate the circuit's response to a random input. The plot of the accumulator value compared to the input waveform is shown in FIG. 5.

Figure 5:
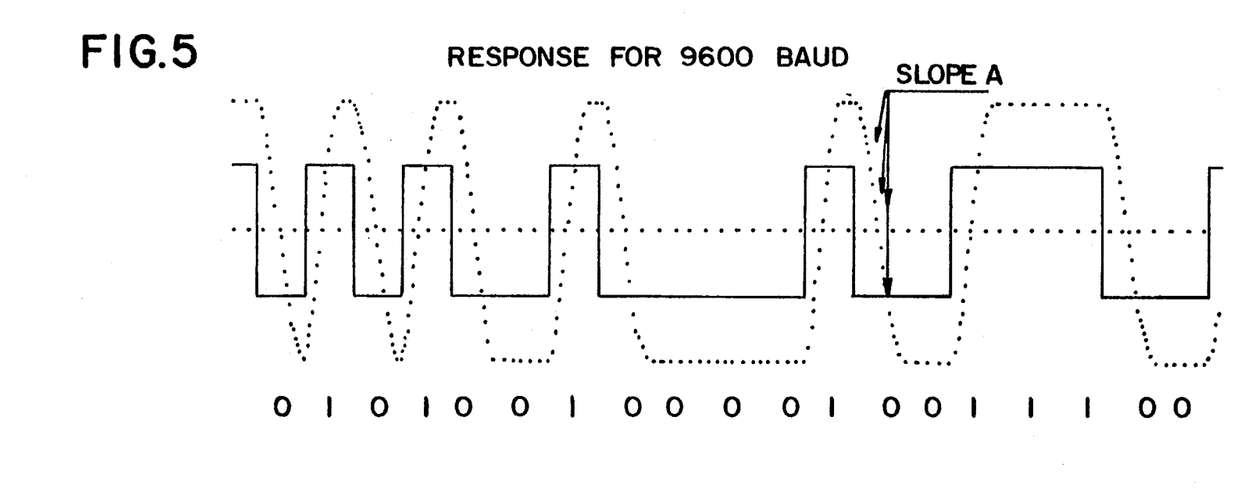
FIG. 5 illustrates a waveform showing the correlation between a signal fed into an FSK transmitter and the corresponding value in an accumulator of an FSK receiver which is receiving the output of the above transmission.

In FIG. 5, the solid line waveform is the data input to an FSK transmitter. The ones and zeroes below the waveform show the data to be transmitted to a distant receiver. The dotted line waveform is the value in the accumulator of the distant receiver. As can be seen in FIG. 5, the dotted line waveform has a number of changes in slope which will be described in more detail below.

Figure 5A:
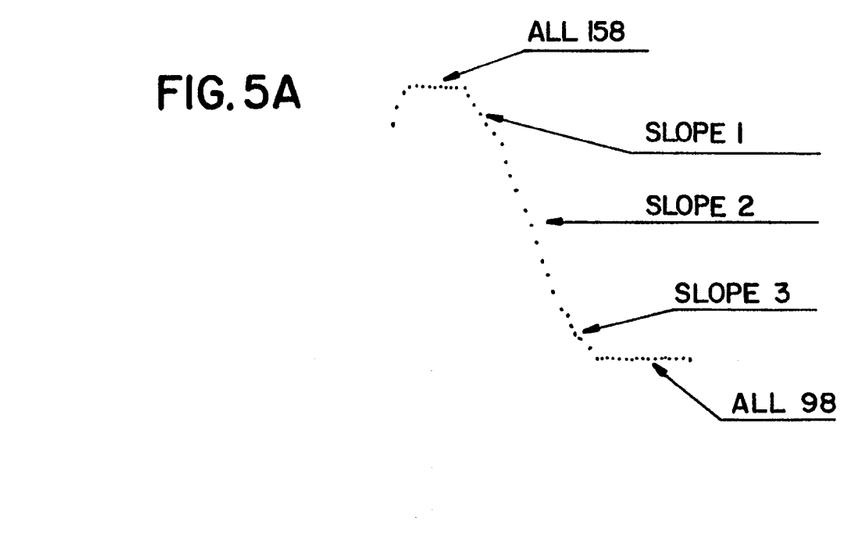
FIG. 5A is a section of the waveform shown in FIG. 5, with an expanded time scale to better illustrate the different slopes of the waveform.

The upper flat portions of the dotted line waveform indicate that the FIFO contains 16 values of 158. The lower flat portions of the dotted line waveform indicate that the FIFO contains 16 values of 98. The slopes which connect the upper and lower portions are a function of when the change from a one to a zero or a zero to a one has occurred. If the data transition occurs at a zero crossing there will be a single slope. If the transition occurs between zero crossings an intermediate count will be stored in the FIFO and three different slopes will occur as shown at slope A, which is a transition between a received one and a received zero, in the dotted line waveform. An enlargement of the slopes of A is shown in FIG. 5A.

Figure 6:
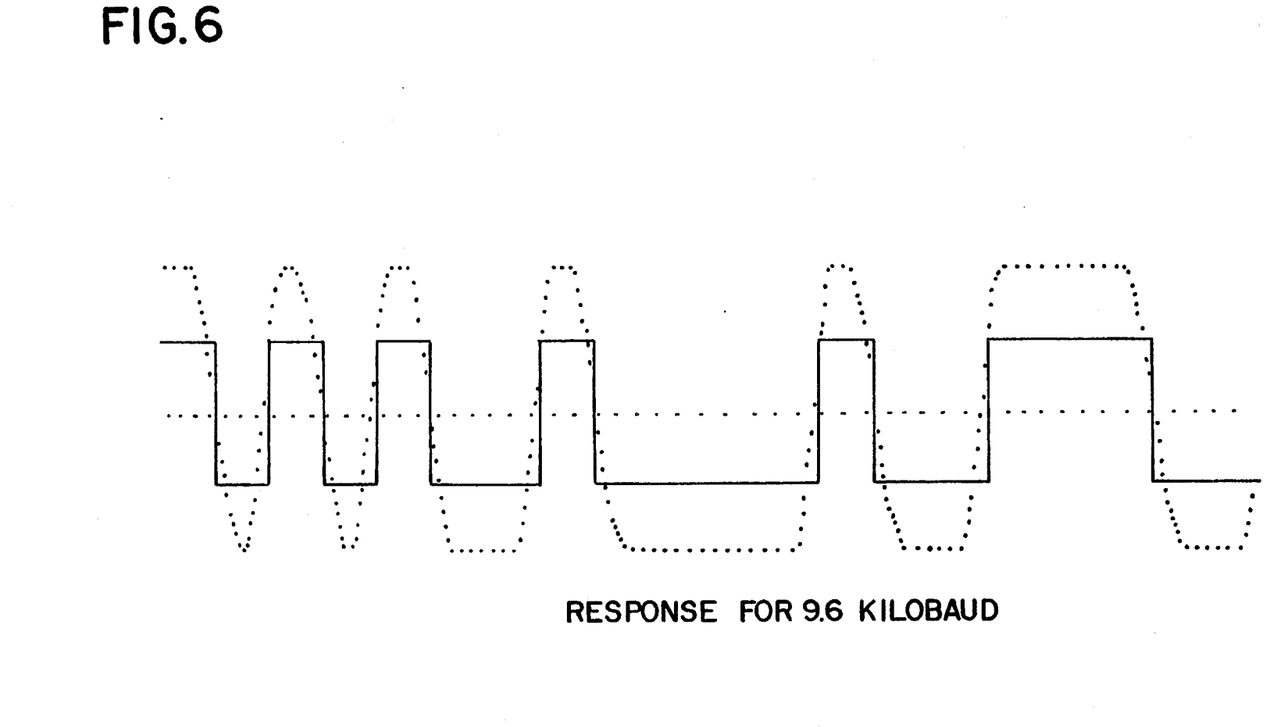
FIG. 6 is a view similar to FIG. 5 with the FSK transmitter input artificially delayed to better illustrate the correlation between the waveforms.

Just prior to the first slope in A, one is being received and 158 is being shifted in an out of the FIFO. Slope 1 of A occurs because 158 is being shifted out of the FIFO but a value less than 158 (and greater than 98) is being shifted in. Slope 2 occurs because 98 is being shifted into the FIFO and 158 is being shifted out. Slope 3 occurs when the intermediate values are shifted out of the FIFO and 98 is being shifted in. When all of the intermediate values are shifted out of the FIFO, the FIFO is loaded with all 98s and the waveform is at the lower flat portion. To make it easier to compare the two waveforms, they are shown in FIG. 6 with input delayed. In both plots, the dotted line is set at the count 2048. The program is listed in Table 5.

A basic design for an all-digital FSK circuit has been disclosed. Without any enhancements, it is likely that the design would satisfy all basic requirements.

Figure 7:
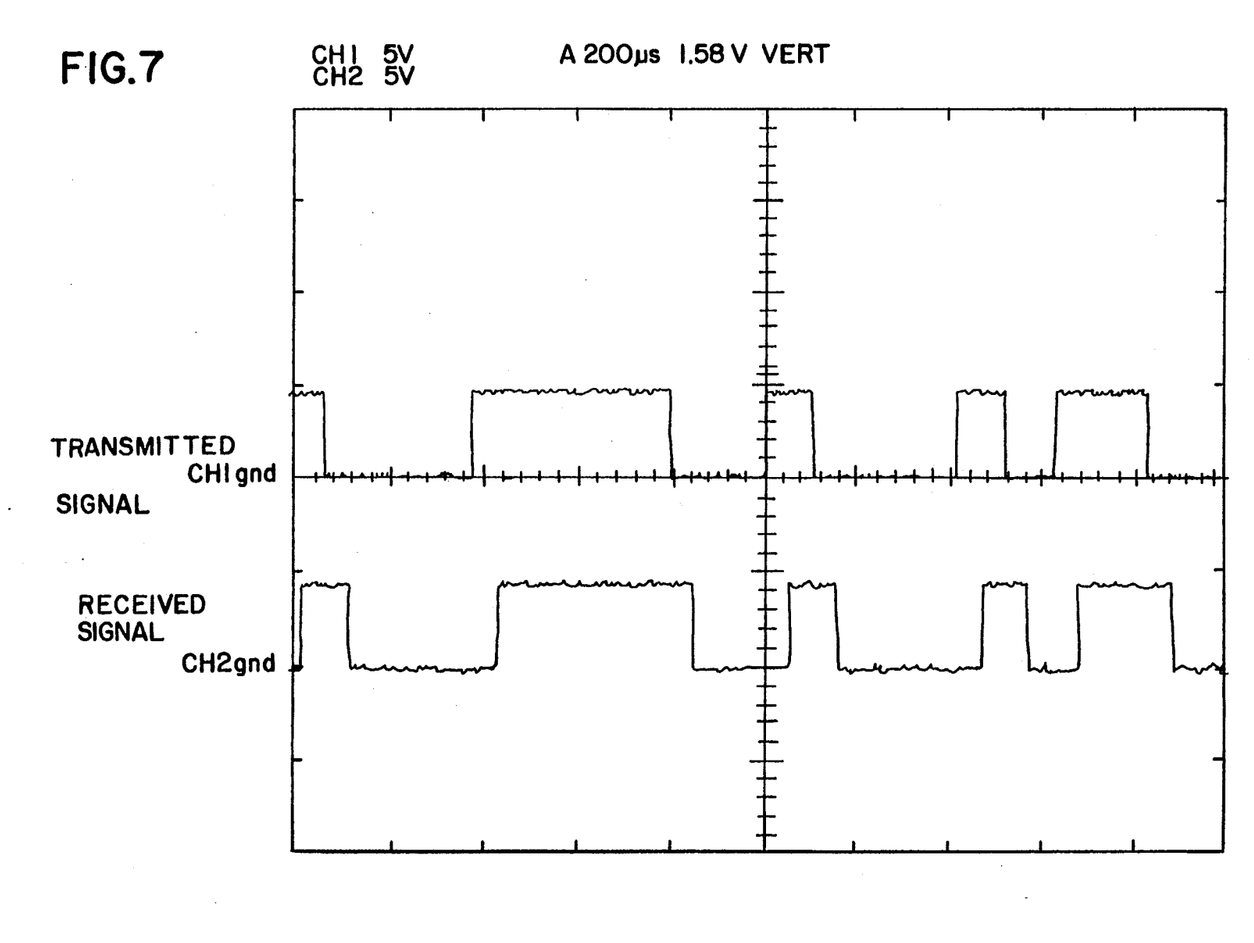
FIG. 7 graphically illustrates the transmitted and received FSK signals for two operating chips embodying the present invention.

FIG. 7 shows the actual results achieved in a gate array chip constructed according to the present invention. FIG. 7 illustrates the delay between the transmitted signal CH1 and the received signal CH2.

While a specific embodiment of the invention has been shown and described in detail to illustrate the application of the principles of the invention, it will be understood that the invention may be embodied otherwise without departing from such principles.

TABLE 1

| 0:  | 0   | 0   | 0   | 0   | 0   |
|-----|-----|-----|-----|-----|-----|
| 5:  | 0   | 0   | 0   | 0   | 0   |
| 10: | 0   | 0   | 0   | 0   | 0   |
| 15: | 0   | 0   | 0   | 0   | 0   |
| 20: | 0   | 0   | 0   | 0   | 0   |
| 25: | 0   | 0   | 0   | 0   | 0   |
| 30: | 0   | 0   | 0   | 0   | 0   |
| 35: | 0   | 0   | 0   | 0   | 0   |
| 40: | 0   | 0   | 0   | 0   | 0   |
| 45: | 0   | 0   | 0   | 0   | 0   |
| 50: | 0   | 0   | 0   | 0   | 37  |
| 55: | 111 | 188 | 264 | 240 | 166 |
| 60: | 88  | 13  | 0   | 0   | 0   |
| 65: | 0   | 0   | 0   | 0   | 0   |
| 70: | 0   | 0   | 0   | 0   | 0   |
| 75: | 0   | 0   | 0   | 0   | 0   |
| 80: | 0   | 0   | 0   | 0   | 0   |
| 85: | 0   | 0   | 0   | 0   | 0   |
| 90: | 0   | 0   | 0   | 0   | 0   |
| 95: | 0   | 0   | 0   | 0   | 0   |

TABLE 3

| 0:  | 0   | 0   | 0   | 0   | 0   |
|-----|-----|-----|-----|-----|-----|
| 5:  | 0   | 0   | 0   | 0   | 0   |
| 10: | 0   | 0   | 0   | 0   | 0   |
| 15: | 0   | 0   | 0   | 0   | 0   |
| 20: | 0   | 0   | 0   | 0   | 0   |
| 25: | 0   | 0   | 0   | 0   | 0   |
| 30: | 0   | 0   | 0   | 0   | 0   |
| 35: | 0   | 0   | 0   | 0   | 0   |
| 40: | 0   | 0   | 0   | 0   | 0   |
| 45: | 0   | 0   | 0   | 0   | 0   |
| 50: | 0   | 0   | 0   | 12  | 69  |
| 55: | 129 | 170 | 162 | 105 | 46  |
| 60: | 4   | 0   | 0   | 0   | 0   |
| 65: | 0   | 0   | 0   | 0   | 0   |
| 70: | 0   | 0   | 0   | 0   | 0   |
| 75: | 0   | 0   | 0   | 0   | 0   |
| 80: | 0   | 0   | 0   | 0   | 0   |
| 85: | 0   | 0   | 0   | 0   | 0   |
| 90: | 0   | 0   | 0   | 0   | 0   |
| 95: | 0   | 0   | 0   | 0   | 0   |

TABLE 2

```
10  REM ************ DIST10 *************
20  OPEN "FIG4.TBL" FOR OUTPUT AS #1
30  THR = 2048
40  INPUT "OFFSET";OFFSET
50  TICK = 4
60  ZTICK = 1/6
70  DIM DTBL(100)
80  ZPER(0) = 1000/61
90  ZPER(1) = 1000/38
100 ZCNT(0) = INT(ZPER(0)/ZTICK) + OFFSET
110 ZCNT(1) = INT(ZPER(1)/ZTICK) + OFFSET
120 FOR J = 0 TO 40
130 DIT = 0
140 FOR I = 0 TO INT(ZPER(1))
150     ATME = (1 -J/40)*TICK
160     ZCNT = ZCNT(0)
170     DIT = DIT + 1
180     ACC = 16*ZCNT(1)
190     ZINT = DIT + (1 − DIT/ZPER(1))*ZPER(0)
200     ATME = ATME + TICK
210     IF (ATME < ZINT) THEN GOTO 200
220     ZCNT = INT(ZINT/ZTICK) + OFFSET
230     ACC = ACC − ZCNT(1) + ZCNT
240     ATME = ATME + TICK
250     IF (ACC <= THR) THEN GOTO 310
260     IF (ATME <= (ZINT + ZPER(0))) GOTO 230
270     ZCNT = ZCNT(0)
280     ACC = ACC -ZCNT(1) + ZCNT
290     ATME = ATME + TICK
300     IF (ACC > THR) GOTO 280
310     DELAY = INT(ATME − DIT + .5)
320     DTBL(DELAY) = DTBL(DELAY) + 1
330 NEXT I
340 NEXT J
```

TABLE 2-continued

```
350 CLS
360 SCREEN 2,0
370 KEY OFF
380 FOR I = 0 TO 99
390 LINE (5*I, 150) − (5*I,150 − DTBL(I)/2)
400 LINE (5*I + 1,150) − (5*I + 1,150 − DTBL(I)/2)
410 LINE (5*I + 2,150) − (5*I + 2,150 − DTBL(I)/2)
420 LINE (5*I + 3,150) − (5*I + 3,150 − DTBL(I)/2)
430 NEXT I
440 FOR I = 1 TO 10
450 PSET(50*I − 5,153)
460 NEXT I
470 LOCATE 22
480 STOP
490 SCREEN 0,0,0
500 FOR I = 0 TO 19
510 VAR = 5*I
520 PRINT #1," ",VAR;
530 FOR J = 0 TO 4
540 VAR1 = 5*I + J
550 PRINT #1,DTBL(VAR1),
560 NEXT J
570 PRINT #1, " "
580 NEXT I
```

TABLE 4

```
10  REM  *********** DIST01 ***************
20  OPEN "FIG7.TBL" FOR OUTPUT AS #1
30  THR = 2048
40  INPUT"OFFSET";OFFSET
50  TICK = 4
60  ZTICK = 1/6
70  DIM DTBL(100)
80  ZPER(0) = 1000/61
90  ZPER(1) = 1000/38
100 ZCNT(0) = INT(ZPER(0)/ZTICK) + OFFSET
110 ZCNT(1) = INT(ZPER(1)/ZTICK) + OFFSET
120 FOR J = 0 TO 40
130     DIT = 0
140     FOR I = 0 TO INT(ZPER(0))
150         ATME = (1 -J/40)*TICK
```

TABLE 4-continued

```
160         ZCNT = ZCNT(0) + OFFSET
170         DIT = DIT + 1
180         ACC = 16*ZCNT(0)
190         ZINT = DIT + (1 − DIT/ZPER(0))*ZPER(1)
200         ATME = ATME + TICK
210         IF (ATME < ZINT) THEN GOTO 200
220         ZCNT = INT(ZINT/ZTICK) + OFFSET
230         ACC = ACC − ZCNT(0) + ZCNT
240         ATME = ATME + TICK
250         IF (ACC >= THR) THEN GOTO 310
260         IF (ATME <= (ZINT + ZPER(1))) GOTO 230
270         ZCNT = ZCNT(1) + OFFSET
280         ACC = ACC − ZCNT(0) + ZCNT
290         ATME = ATME + TICK
300         IF (ACC < THR) GOTO 280
310         DELAY = INT(ATME − DIT + .5)
320         DTBL(DELAY) = DTBL(DELAY) + 1
330     NEXT I
340 NEXT J
350 CLS
360 SCREEN 2,0
370 KEY OFF
380 FOR I = 0 TO 99
390 LINE (5*I,150) − (5*I, 150 − DTBL(I)/2)
400 LINE (5*I + 1,150) − (5*I + 1,150 − DTBL(I)/2)
410 LINE (5*I + 2,150) − (5*I + 2,150 − DTBL(I)/2)
420 LINE (5*I + 3,150) − (5*I + 3,150 − DTBL(I)/2)
430 NEXT I
440 FOR I = 1 TO 10
450 PSET(50*I = 5,153)
460 NEXT I
470 LOCATE 22
480 STOP
490 SCREEN 0,0,0
500 FOR I = 0 TO 19
510 VAR = 5*I
520 PRINT #1, VAR;
530 FOR J = 0 TO 4
540 VAR1 = 5*I + J
550 PRINT #1, DTBL(VAR1),
560 NEXT J
570 NEXT I
580 CLOSE #1
```

TABLE 5

```
10   BRATE = 9.600001
20   TICK = 4
30   ZTICK = 1/6
40   PH = 12
50   SMPLS = 100
60   DIM ZTBL(SMPLS)
70   DIM DTBL(600)
80   DIM ATBL(SMPLS)
90   DIM ACCTBL(600)
100  ACC = 16*98
110  ZPER(0) = 16.393
120  ZPER(1) = 26.316
130  ZCNT(0) = INT(ZPER(0)/ZTICK)
140  ZCNT(1) = INT(ZPER(1)/ZTICK)
150  DVALI = 27
160  DVAL = DVALI
170  BPER = 1000/BRATE
180  BTME = BPER
190  D = 0
200  NXD = 1
210  FOR I = 1 TO SMPLS
220  DTBL(I) = ATME
230  IF (ZPER(D) > BTME) THEN GOTO 240 ELSE GOTO 330
240      R = BTME/ZPER(D)
250      ZINT = R*ZPER(D) + (1 − R)*ZPER(NXD)
260      D = NXD
270      NXD1 = (DVAL AND 64)/64
280      NXD2 = (DVAL AND 32)/32
290      NXD = NXD1 XOR NXD2
300      DVAL = (DVAL*2 + NXD) MOD 128
310      BTME = BTME + BPER
320      GOTO 340
330  ZINT = ZPER(D)
340  ATME = ATME + ZINT
350  ATBL(I) = ATME
```

TABLE 5-continued

```
360     BTME = BTME - ZINT
370     ZTBL(I) = INT(ZINT/ZTICK)
380     ZTME = ZINT
390   NEXT I
400   FIN = 16
410   DIM FIFO(FIN)
420   FOR I = 0 TO 15
430     FIFO(I) = 98
440   NEXT I
450   ATBL(0) = 0
460   ZTBL(0) = 16.913
470   TPTR = 1
480   TME = 0
490   TPTR = 1
500   FPTR = 0
510   TPTR = TPTR + 1
520   NVAL = ZTBL(TPTR)
530   NSMPLS = INT(ATBL(SMPLS)/TICK
540   FOR I = 1 TO NSMPLS
550     TME = TME + TICK
560     IF (TME <= ATBL(TPTR)) THEN GOTO 580
570       TPTR = TPTR + 1
580     NFIFO = ZTBL(TPTR - 1)
590     ACC = ACC - FIFO(FPTR) + NFIFO
600     ACCTBL(I) = ACC
610     FIFO(FPTR) = NFIFO
620     FPTR = (FPTR + 1) MOD 16
630   NEXT I
640   DVAL = DVALI
650   D = 0
660   NXD = 1
670   STME = 1000/BRATE
680   FOR I = 1 TO NSMPLS
690     DTBL(I) = D
700     BTME = BTME - TICK
710     IF (BTME > 0) THEN GOTO 780
720     BTME = BTME + 1000/BRATE
730     D = NXD
740     NXD1 = (DVAL AND 64)/64
750     NXD2 = (DVAL AND 32)/32
760     NXD = NXD1 XOR NXD2
770     DVAL = (2*DVAL + NXD) MOD 128
780   NEXT I
790   CLS
800   SCREEN 2.0
810   KEY OFF
820   PSET(0,98)
830   FOR I = 16 TO NSMPLS
840     Y = INT(ACCTBL(I)/16)
850     PSET (I,Y)
860     PSET(I,113 + 30*DTBL(I - PH))
861     IF (DTBL(I = PH -1) = DTBL(I - PH)) THEN GOTO 870
862       FOR J = 0 TO 30
863         PSET(I, 113 + J)
864       NEXT J
870     IF ((I AND 6) = 0) THEN PSET(I, 128)
880   NEXT I
890   LOCATE 22,20
900   V = INT(10*BRATE)
910   V = V/10
920   PRINT"   RESPONSE FOR ";V; " KILOBAUD"
```

I claim:

1. A digital FSK receiver for receiving an FSK signal containing at least two different signal frequencies, comprising:

a zero crossing detector for detecting zero crossings of the FSK signal;

interval measuring means connected to the zero crossing detector for measuring the intervals between the zero crossings, the intervals having a first value when the FSK signal is at one of the at least two signal frequencies, a second value when the FSK signal is at the other of the at least two signal frequencies, and a plurality of intermediate values which are between the first and second values when the FSK signal switches between the frequencies;

binary output means connected to the interval measuring means for receiving the interval values and or outputting a binary signal which switches between logical zero and logical one states when the binary output means receives one of the intermediate values;

wherein the interval measuring means comprises a zero crossing counter connected to the zero crossing detector, a clock connected to the zero crossing counter for pulsing the zero crossing counter a plurality of times between each zero crossing, the zero crossing counter counting the number of clock pulses between intervals, and a zero crossing register connected to the zero crossing counter for storing the number of clock pulses counted during each interval which corresponds to one of the values for the interval; and a first in-first out buffer for receiving the contents of the zero crossing register and for applying the contents of the zero crossing register to the binary output means.

2. A digital FSK receiver according to claim 1 wherein the binary output means comprises an accumulator having an output for the binary zeros and ones, and an input, the binary output means including a binary adder connected between the buffer and the accumulator input for accumulating the interval values in the accumulator.

3. A digital FSK receiver according to claim 2, wherein the first in-first out buffer is connected to the zero crossing register, and including a complimentor connected to an output of the first in-first out buffer and an 8 stage binary adder having a first input connected to the output of the register and a second input connected to the output of the complimentor, the 8 stage binary adder having an output connected to an input binary adder.

4. A method of recovering baseband and signal from a FSK signal having at least two different signal frequencies, comprising:

detecting the zero crossings in the FSK signal;

measuring the intervals between the zero crossings of the FSK signal by counting clock pulses between zero crossings and storing the counted clock pulses in a register, the intervals having a first value when the FSK signal is at one of the two signal frequencies, a second value when the FSK signal is at the other of the two signal frequencies and a plurality of intermediate values which are between the first and second values when the FSK signal switches between the frequencies;

generating a binary signal which switches between logical zero and logical one states when the interval is at one of the intermediate values; and applying the stored counted pulses to a first in-first out buffer and outputting a signal from the first in-first out buffer to a binary adder and converting the counted pulses to the logical zeros and ones.

5. A method according to claim 4 including accumulating the interval values from the adder into an accumulator and outputting the binary signal from the accumulator.

* * * * *